United States Patent Office 2,796,131
Patented June 18, 1957

2,796,131
PROCESS FOR IMPROVING THE OIL-WATER RATIO OF OIL AND GAS WELLS

William E. Hinchliffe and Wayne F. Hower, Duncan, Okla., assignors to Halliburton Oil Well Cementing Company, Duncan, Okla.

No Drawing. Application August 8, 1955, Serial No. 527,154

10 Claims. (Cl. 166—29)

This invention relates to a process for decreasing the permeability of water encroached zones of oil and gas producing formations and increasing the production of oil bearing zones of such formations.

This application is co-pendant with application Serial No. 397,484, filed December 10, 1953.

Since the inception of the oil industry, there has been a universal and well-founded fear of water encroachment; this probably being the most important factor contributing to oil well abandonment.

Nearly every producing formation will, at some time during the life of the well, concurrently produce some proportion of water with the oil and gas. It is understandable that such water production is highly undesirable. In addition to increased pumping and separating costs, the proportion of oil produced from the formation usually becomes progressively less due to the "coning" action of the encroaching water. This "coning" action is the tendency of the water, usually found in the lower strata of a producing formation, to permeate up through the oil bearing strata found immediately about the well bore and thus obstruct oil passage into the well bore.

There have been several methods used to combat water encroachment which include ordinary "plugback" cementing procedures, various methods of creating chemical precipitants from water solutions, "squeeze cementing" with water-cement slurries, and, of late, oil-cement slurries. Squeeze cementing methods, particularly those using the oil-cement slurry provided in the referenced co-pending application, have proved very successful.

Many methods have been devised for increasing permeabilities of oil sand. These include uses of solvents, perforations, heat, and acids, each applied to peculiar formation conditions. Of late a method generally termed "hydraulic fracturing" has come into practice wherein a thickened fluid, usually entraining a suitable propping aggregate, is pumped into a formation at pressures sufficient to fracture the formation and deposit the aggregate therein. Provision is usually made to reduce the viscosity of such fluids upon completion of a fracturing operation in order to allow their removal from the well. Such fluids are usually non-aqueous, but occasionally aqueous fluids are used for special purposes, such as water wells. The fracturing fluids used in connection with this invention will be non-aqueous.

In past practice, those wells which produce unwanted water have been treated with the oil-cement squeeze as described in the referenced co-pending application; then, after the cement has set, the oil bearing zone is perforated or fractured to increase oil flow. When such zones are fractured, difficulty has been encountered in that the water bearing zone generally fractures first, as later described, nullifying the cement squeeze operation.

The process provided by the present invention alleviates this difficulty and permits both the cement squeeze operation and the fracturing operation to be performed in cooperation.

It is now seen that the objects provided by this invention are to close off water bearing zones of a formation and increase the production of oil bearing zones of said formation, concurrently preventing reopening of said water bearing zones.

In accordance with the invention, a process is provided which includes: the displacing of water from a well bore and surrounding formation with a non-aqueous fluid containing an oil-water interfacial tension reducing agent; squeezing an oil-cement slurry having special ingredients therein into the water-bearing zone of a formation; allowing said slurry to contact formation water and stiffen into a highly viscous (termed pasty) state; fracturing the oil bearing zone of said formation with a viscous fluid entraining a propping aggregate; and controlling points of fracture by means of the pasty properties of said slurry.

The displacing fluid provided may be any essentially anhydrous oil of low viscosity. Examples are diesel fuel, kerosene, or clean crude oil of high gravity (API). The tension reducing agent as provided in this fluid serves to reduce oil-water interfacial tension and, when displaced into the formation, drives both infiltrated and connate water from the formation immediately surrounding the well bore. Examples of this agent are the acromatic sulfonic acids.

As described in the referenced co-pending application, the oil-cement slurry provided in this invention is essentially composed of Portland cement, anhydrous oil, and a surface active agent which serves to enhance dispersing and suspending qualities of the cement particles in the oil. The surface active agent additionally permits slurries of greater density and further permits water to penetrate the slurry with little or no outside pressure. Examples of these surface active agents are nonionic compounds, such as alkyl phenoxy polyoxyethylene, and also cationic compounds, such as substituted oxazolines.

The fracturing fluids provided in this invention may be any of several crude oils or refined oils commonly used for this purpose. These oils may be gelled, and have gel breaking means, or they may be of inherent viscosity sufficient to suspend the propping aggregates. Any desired aggregate having proper strength, size, and shape may be provided, round grained sand of 20–40 mesh being commonly used. Examples of such fluids are taught in Patent No. 2,596,843 to Farris.

In practicing this invention, the displacing fluid is injected into a well bore in sufficient quantity to drive water out of the well bore and several inches of surrounding formation. Thus, any water which has coned up into the oil bearing zone will be given away from the well bore.

The cement slurry is then pumped into the well bore following the displacing fluid and sometimes allowed to stand in the well bore for a short interval before further action. Such delay allows the slurry to thicken slightly upon contact with any residual traces of water not previously removed. Such thickening is occasionally desirable when squeezing highly permeable or unconsolidated formations as it facilitates control of the cement passage into the formation. Unless warranted, such delay is not employed.

The zones encroached by water are usually found to be structurally weaker and sometimes more permeable than those bearing oil. This situation may possibly be caused by a dissolving of certain water soluble cementitious constituents of such formations.

A squeeze pressure is then applied, forcing the cement slurry into the water bearing zone. Determination of such passage is usually perceptible from the surface. In some instances a continued rise in squeeze pressure indicates an increasing resistance of cement passage. If the rise continues steadily to a very high level followed by an abrupt drop, a breakdown of the oil bearing zone is indicated and injection is halted. In other instances, the pressure may drop at a comparatively low level, indicating a breakdown of the water bearing zone, then rise upon additional injection to break down again at a higher level, indicating a breakdown in the oil bearing zone. Pumping is halted at this point.

The cement is now held in place for a period sufficient to allow the cement to receive water from the formation and thicken thereby. Receipt of very little water causes a great and rapid increase in viscosity (to an actual pasty state). Under controlled conditions, it has been found that addition of water to the slurry in proportions as little as 3% to 5% by volume will cause this increase. This phenomenon is primarily attributed to the synergetic action of the previously described surface active agent. This period may vary from merely that time necessary to complete placement of the cement in the formation to as much as thirty minutes.

It is pointed out that this delay will vary somewhat with each particular application; it being discernible that different formations will have varied water content and other factors.

When the cement has reached a desirable pasty state, a fracturing fluid is injected with injection pressure sufficient to fracture the formation. It may be seen that the now thickened cement occupying the water bearing zone of the formation will require a greater fluid pressure to displace than will the fracturing fluid into the oil bearing zone. It may also be seen that the amorphous character of the pasty cement will serve to prevent any further fluid passage into the water bearing zone as it will deform and fill any new or widening fissures caused by the fracturing pressure. Thus, the fracturing fluid will be diverted to and create fissures only in the oil bearing zone.

According to practices well known in the art, the fracturing fluid, containing the propping aggregate, is subsequently displaced from the well bore by some medium such as crude oil or a suitable gel breaker for the fracturing fluid. After a period sufficient to allow setting of the cement, the well may be pumped or flowed.

It is pointed out that the success of this invention is contingent upon the unique control of the fracturing fluid afforded by the described oil-cement slurry and it peculiar thickening and amorphism when wetted.

It is also pointed out that the interfacial reducing agent employed in the initial displacing fluid is highly desirable and believed to contribute to the success of the invention.

Cited are two examples of successful well treatments experimentally conducted in accordance with this invention.

A West Texas well was producing fifteen barrels of oil per day (BOPD) and thirty-six barrels of water per day (BWPD) before treatment. In accordance with the invention herein described, fifteen gallons of a tension reducing agent, mixed in thirty barrels of oil, were pumped into the well, followed by seventy-five sacks of cement mixed with diesel oil containing a surface active agent. The cement slurry was displaced into the formation with twenty barrels of crude oil and immediately followed by five thousand gallons of fracturing fluid containing five thousand pounds of sand. After treatment, the well produced sixty BOPD and no water. Production after five months was seventy-nine BOPD and three BWPD.

Another West Texas well was producing seven BOPD and forty-two BWPD before treatment. Fifteen gallons of tension reducing agent, mixed with thirty barrels of crude oil, were pumped into the well followed by seventy-five sacks of cement mixed with diesel oil containing a surface active agent. The cement was displaced into the formation with crude oil, allowed twenty minutes to thicken, and followed by five thousand gallons of fracturing fluid containing five thousand pounds of sand. Production after treatment was thirty-five BOPD and eighteen BWPD.

These and other experimental jobs, performed in accordance with the invention described herein, have proved to be of outstanding service to the oil industry and have promise to be of great value.

It is seen that discretion may be employed by those skilled in this art as to proportions, thickening times, and other factors peculiar to each treated well and yet be in conformance with the spirit of this invention and the scope of the annexed claims.

We claim:
1. A process for treating a well formation containing both oil and water strata which comprises the steps of displacing water from a well bore and that formation immediately surrounding said well bore, injecting a non-aqueous slurry comprised of cement, a surface active agent, and an anhydrous oil into placement in said formation, allowing said slurry to thicken upon contact with water contained in said water strata, fracturing said formation by hydraulic injection of a fracturing fluid, the thickened slurry preventing fracture of said water strata, and producing said formation after setting of the thickened slurry.

2. The process as defined in claim 1 wherein the surface active agent is nonionic.

3. The process as defined in claim 1 wherein the surface active agent is cationic.

4. The process as defined in claim 1 wherein water is displaced by means of an oil-water interfacial tension reducing agent contained in an anhydrous oil.

5. A process for treating a well formation containing both oil and water bearing strata which comprises the steps of displacing water from a well bore and that formation immediately surrounding said well bore with a non-aqueous fluid containing an oil-water interfacial tension reducing agent, injecting an oil-cement slurry into placement in said formation, allowing said slurry to thicken upon contact with water contained in said water bearing strata, hydraulically fracturing said formation by injection of a non-aqueous fracturing fluid, the thickened slurry preventing fracture of water bearing zones, and producing said formation upon setting of the thickened slurry.

6. The process defined in claim 5 wherein the oil-cement slurry contains a surface active agent.

7. The process defined in claim 5 wherein the oil-water interfacial tension reducing agent is an aromatic sulfonic acid.

8. A process for treating a well formation containing both oil and water strata comprising the steps of, displacing water from a well bore and that formation immediately surrounding said well bore, injecting a non-aqueous slurry comprised of cement, a surface active agent, and an anhydrous oil into placement in said formation, allowing said slurry to thicken upon contact with water contained in said formation, fracturing said formation by hydraulic injection of a fracturing fluid, the thickened slurry being adapted to prevent fracture of water bearing strata of said formation, and producing said formation after setting of the thickened slurry.

9. A process for treating a well formation containing both oil and water comprising the steps of, injecting a non-aqueous fluid into a well bore sufficient to displace water from said well bore and that formation immediately surrounding said well bore, injecting an oil-cement slurry into placement in said surrounding formation, allowing said slurry to thicken upon contact with any water contained in said formation, said slurry being adapted to undergo a great and rapid increase in viscosity upon such contact, injecting sufficient fracturing fluid into said well bore to fracture said formation, said thickened slurry being adapted to prevent fracturing of water containing strata of said formation, and producing said formation after said thickened slurry has set.

10. The process defined in claim 9 wherein said fracturing fluid has a propping aggregate suspended therein.

References Cited in the file of this patent
UNITED STATES PATENTS

| Number | Name | Date |
|---|---|---|
| 1,107,979 | Mitchell | Aug. 18, 1914 |
| 1,601,295 | Collings | Sept. 28, 1926 |
| 1,644,965 | Welch | Oct. 11, 1927 |
| 2,596,843 | Farris | May 13, 1952 |
| 2,642,142 | Clark | June 16, 1953 |
| 2,654,674 | Frankenhoff | Oct. 6, 1953 |